United States Patent [19]
Rose et al.

[11] Patent Number: 5,973,914
[45] Date of Patent: Oct. 26, 1999

[54] CIRCUIT BREAKER HOLD-DOWN

[75] Inventors: William E. Rose, Grayson; Samuel C. Strawn, Avondale Estates; Edward L. Tevis, Tucker, all of Ga.

[73] Assignee: Siemens Energy & Automation, Inc., Alpharetta, Ga.

[21] Appl. No.: 08/826,452

[22] Filed: Mar. 27, 1997

[51] Int. Cl.⁶ .................................................. H02B 1/01
[52] U.S. Cl. .......................... 361/627; 361/641; 361/643; 361/644; 361/645; 361/647; 361/634; 361/637; 200/50.4
[58] Field of Search ................................. 361/627, 644, 361/645, 637, 634; 200/50.4

[56] References Cited

U.S. PATENT DOCUMENTS

| | | | |
|---|---|---|---|
| 4,435,739 | 3/1984 | Shelvik | 361/627 |
| 4,646,199 | 2/1987 | M'Sadoques et al. | 361/634 |
| 5,393,942 | 2/1995 | Reiner et al. | 361/627 |

*Primary Examiner*—Leo P. Picard
*Assistant Examiner*—Boris L. Chervinsky

[57] ABSTRACT

An attachment for attaching a main circuit breaker in an electrical panel has a uniquely constructed hold-down for the circuit breaker and a headed screw for fastening the hold-down in the panel. The hold-down is a non-electrically conductive part, such as a plastic. A circuit-breaker-engaging projection for engaging a circuit breaker projects from a first side of the hold-down body and a gripping tab projects from a second side of the body opposite the first side. A shank of the headed screw passes through a through-hole in the hold-down body to thread into a hole in a base pan. The screw is tightened against the hold-down body to hold it, and in turn the main circuit breaker, in place. In such an installed condition, the main circuit breaker cannot be removed easily from the panel unless the screw is intentionally unscrewed by a tool sufficiently to allow movement of the hold-down to a position that enables the main circuit breaker to be removed. The hold-down includes certain features that are intended to reduce the risk that the tool might contact parts other than the screw and the hold-down during unscrewing. The gripping tab facilitates installation and removal, and provides an obstruction to any attempted installation of one or more extra distribution circuit breakers in a vacant space along side the main circuit breaker that is being held in place by the hold-down.

12 Claims, 5 Drawing Sheets

CIRCUIT BREAKER HOLD-DOWN

FIELD OF THE INVENTION

This invention relates generally to electrical panels, such as load centers for example, that serve to distribute electric power from a utility to various load or distribution circuits through circuit protection devices such as electric circuit breakers.

BACKGROUND AND SUMMARY OF THE INVENTION

Commonly-owned, pending U.S. patent application Ser. No. 08/622,971 filed March 1996, discloses an electrical panel containing an electrically non-conductive basepan for two rows of back-fed circuit breakers. Each of two respective bus bars is disposed on a respective half of a front facing surface of the basepan and connected to an incoming hot feed that is brought into the panel from the electric power utility by one or more incoming hot cables. The two bus bars are separated from each other by a serpentine wall that is present on the basepan between the two bus bars. Each bus bar contains a number of stabs that collectively are arranged in respective rows, and each of which points in a direction toward the deadfront. The serpentine wall has a shape that winds between the stabs of one bus bar and those of the other. A respective back-fed distribution circuit breaker fits onto a respective stab of a bus bar to establish electric connection of the bus bar to the hot side of the circuit breaker. A load wire of each distribution circuit that is served by the electrical panel is attached to the load side of a respective distribution circuit breaker. Neutral bars on the base pan provide for the connection of individual neutral return wires of the respective distribution circuits to a neutral that is brought into the panel from the electric power utility by one or more incoming neutral cables and connected to the neutral bars.

One type of electrical panel has a main circuit breaker through which the incoming hot feed is connected to the distribution circuit breakers. Such a main circuit breaker, like the distribution breakers, is selectively operable to on and off positions. When operated to its on position, it is effective to conduct the hot feed to the distribution circuit breakers, and when operated to its off position, it is effective to shut off the hot feed to the distribution circuit breakers.

In certain electrical panels of this type that have distribution circuit breakers arranged in side-by-side rows as described above, it is believed that there is some benefit in arranging the main circuit breaker in one of the two rows. Such a main circuit breaker may comprise a profile that is essentially like that of the distribution circuit breakers in the same row for fitting to a base pan, the fitting of the distribution circuit breakers to the base pan.

Attachment of such a main circuit breaker to an electrical panel may have to comply with certain applicable standards. For example, one potentially applicable standard provides that before it becomes possible to remove an installed main circuit breaker from a panel, a manual operation must be performed on an attachment that holds the main circuit breaker in place. Such a standard may concern inadvertent, or unintentional, removal of a main circuit breaker from a panel. The manual operation performed on the attachment is generally done with forethought.

It may be desirable to organize and arrange an electrical panel so as to make it more difficult to circumvent potentially applicable standards. For example, a panel that is designed to have two rows of circuit breakers, including a main circuit breaker in one of the rows, may be designed for a maximum number of distribution circuit breakers in each row. In such a design, the row that does not contain the main circuit breaker may have vacant space in the location that is side-by-side with the main circuit breaker. If such a panel is designed to accommodate equal numbers of distribution circuit breakers in each row that add up to the maximum number allowed by a potentially applicable standard, compliance with such a standard may be achieved either by the placement of a prominent warning against attempting to install additional distribution circuit breakers in such vacant space, and/or by mechanically making it more difficult to install extra distribution circuit breakers in the vacant space.

The present invention is directed to a novel attachment for a main circuit breaker that is believed to address concerns such as those just discussed.

A presently preferred embodiment of the invention relates to a main circuit breaker attachment comprising first and second parts, wherein the first part is believed to be a uniquely constructed hold-down for the circuit breaker and the second part is a headed screw for fastening the hold-down in the panel. The hold-down is a non-electrically conductive part, such as a suitably molded plastic. The hold-down engages the main circuit breaker, and a shank of the headed screw passes through a through-hole in the hold-down to thread into a hole in the base pan. The screw is tightened against the hold-down to hold it, and in turn the main circuit breaker, in place. In such an installed condition, the main circuit breaker cannot be removed at least easily from the panel unless the screw is first sufficiently loosened, and perhaps even removed from the hold-down, to allow movement of the hold-down to a position that enables the main circuit breaker to be removed. Because unfastening of the attachment screw may involve the use of a hand tool such as a screwdriver, the hold-down includes certain features that are intended to minimize or at least reduce the risk that the tool might contact parts other than the attachment screw and the hold-down during the process of unfastening the attachment screw. The hold-down further includes a finger-grippable tab that is designed both to facilitate installation and removal, and to provide an obstruction to any attempted, potentially non-compliant, installation of one or more extra distribution circuit breakers in vacant space along side the main circuit breaker that is being held in place by the hold-down. The tab may be provided with further useful features, such as texturing or ribbing to facilitate gripping, and informational and/or warning indicia. The hold-down may also be distinctively colored as a potential aid in directing a person's attention to it so that the presence of a main circuit breaker in a panel may be better recognized.

One object of the invention is to provide an electric distribution panel through which incoming electric power is distributed through circuit breakers to individual distribution circuits, the panel comprising: a main circuit breaker through which incoming electric power passes; a number of individual distribution circuit breakers; first and second bus bars for delivering incoming electric power from the main circuit breaker to the individual distribution circuit breakers; an attachment for attaching the main circuit breaker to the panel that requires performance of a manual operation before the main circuit breaker can be detached from the panel; the attachment comprising a first part and a second part; the first part having an association with the main circuit breaker, when the first part is disposed in an attached position, to prevent the main circuit breaker from being detached from the panel; the second part having an association with the first part, when the first part is in attached position and when the second part is in an attaching position, that keeps the first part in attached position; and the second part being operable by a manual operation from attaching position to a non-attaching position to allow the first part to move to a non-attached position that ceases to at least better prevent the main circuit breaker from being detached from the panel.

Still another object of the invention is to provide an electric distribution panel as set forth above wherein the main circuit breaker comprises two side-by-side conjoined circuit breakers, and the first part comprises a body with which the second part has association and a projection projecting from the body to fit between the side-by-side conjoined circuit breakers that at least better prevent them from being detached from the panel.

Still another object of the invention is to provide an electric distribution panel as set forth above wherein the body comprises a through-hole and the second part comprises a fastener that acts via the through-hole to hold the first part in the panel.

Still another object of the invention is to provide an electric distribution panel as set forth above wherein the fastener comprises a screw having a head that bears against the body and a threaded shank that extends from the head through the through-hole.

Still another object of the invention is to provide an electric distribution panel as set forth above wherein the body comprises a frontally facing surface against which the screw head bears and a wall extending frontally from the frontally facing surface and circumferentially bounding at least a portion of the screw head.

Still another object of the invention is to provide an electric distribution panel as set forth above wherein the body comprises a walled well having a frontal opening disposed adjacent the through-hole.

Still another object of the invention is to provide an electric distribution panel as set forth above wherein the wall extending frontally from the frontally facing surface and circumferentially bounding at least a portion of the screw head fully circumferentially bounds both the screw head and the frontal opening of the well.

Still another object of the invention is to provide an electric distribution panel as set forth above wherein the projection projects laterally from a first side of the body, and the body includes a further projection projecting from a second side of the body opposite the first side.

Still another object of the invention is to provide an electric distribution panel as set forth above wherein the further projection comprises a tab occupying a plane that is skewed to the length of the through-hole.

Still another object of the invention is to provide an electric distribution panel as set forth above wherein the further projection comprises a tab that has a size sufficient for gripping between a person's thumb and forefinger.

Still another object of the invention is to provide an electric distribution panel as set forth above wherein the first part comprises a body having a circuit-breaker-engaging projection at a first side of the body engaging the main circuit breaker and a tab projecting from a second side of the body.

Still another object of the invention is to provide an electric distribution panel as set forth above wherein the first and second sides of the body are disposed opposite each other and the tab extends at an angle frontally of the body.

Still another object of the invention is to provide an electric distribution panel as set forth above wherein the body comprises a through-hole and the second part comprises a fastener that acts via the through-hole to hold the first part in the panel.

Still another object of the invention is to provide a hold-down for use in attaching a circuit breaker to an electrical panel comprising a non-electrically conductive body, a circuit-breaker-engaging projection at a first side of the body for engaging a circuit breaker and a gripping tab projecting from a second side of the body.

Still another object of the invention is to provide a hold-down as set forth above wherein the first and second sides of the body are disposed opposite each other and the gripping tab extends at an angle frontally of the body.

Still another object of the invention is to provide a hold-down as set forth above wherein the body comprises a through-hole having an entrance at a frontal surface of the body that is disposed between the first and second sides.

The foregoing, along with further features, advantages, and benefits of the invention, will be seen in the ensuing description and claims, which are accompanied by drawings. The description and drawings disclose a presently preferred embodiment of the invention according to the best mode contemplated at this time for carrying out the invention.

DESCRIPTION OF THE PREFERRED EMBODIMENT

Figure 1:
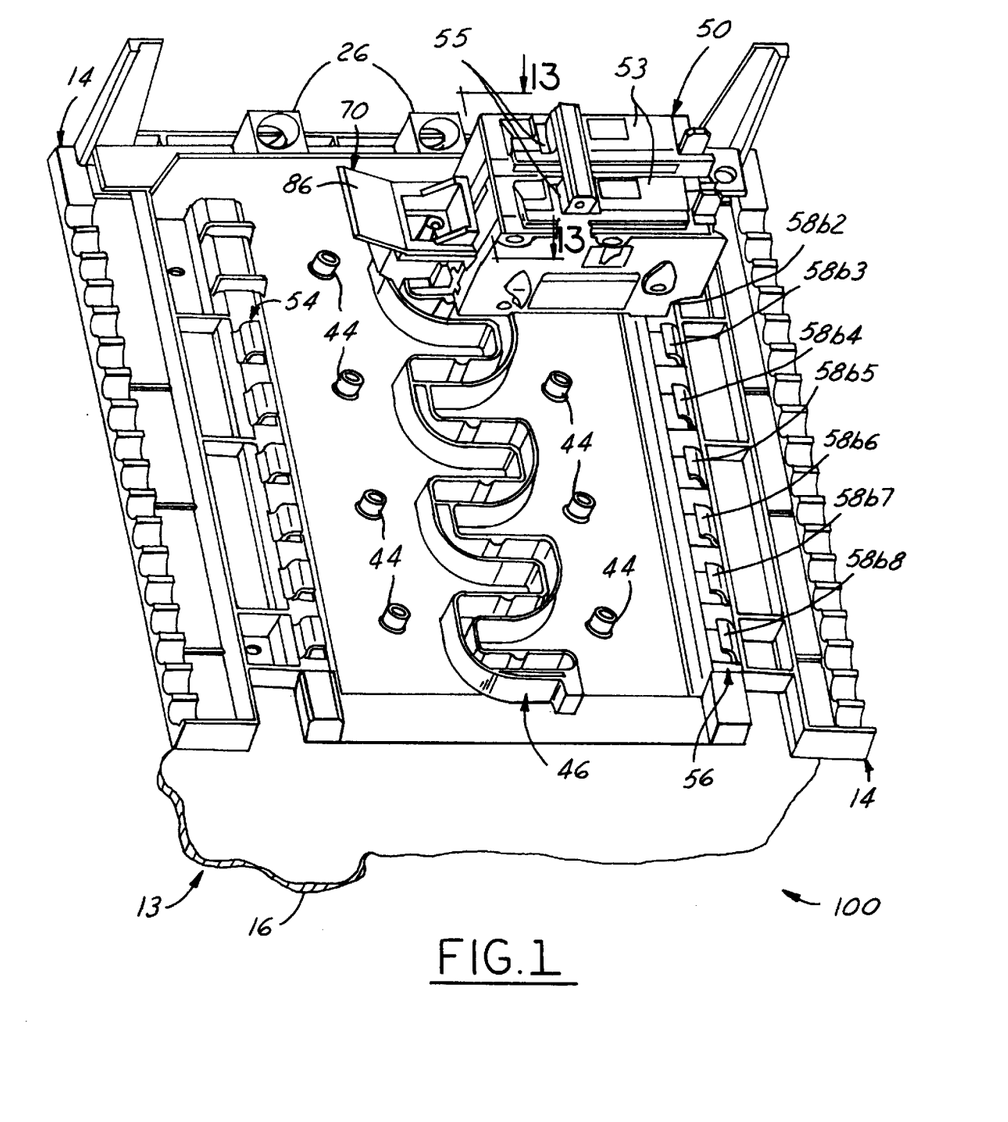
FIG. 1 is a perspective view of a portion of an exemplary electrical panel behind a deadfront embodying bonding principles of the present invention, certain portions, including the deadfront, having been removed for illustrative presentation.
Figure 2:
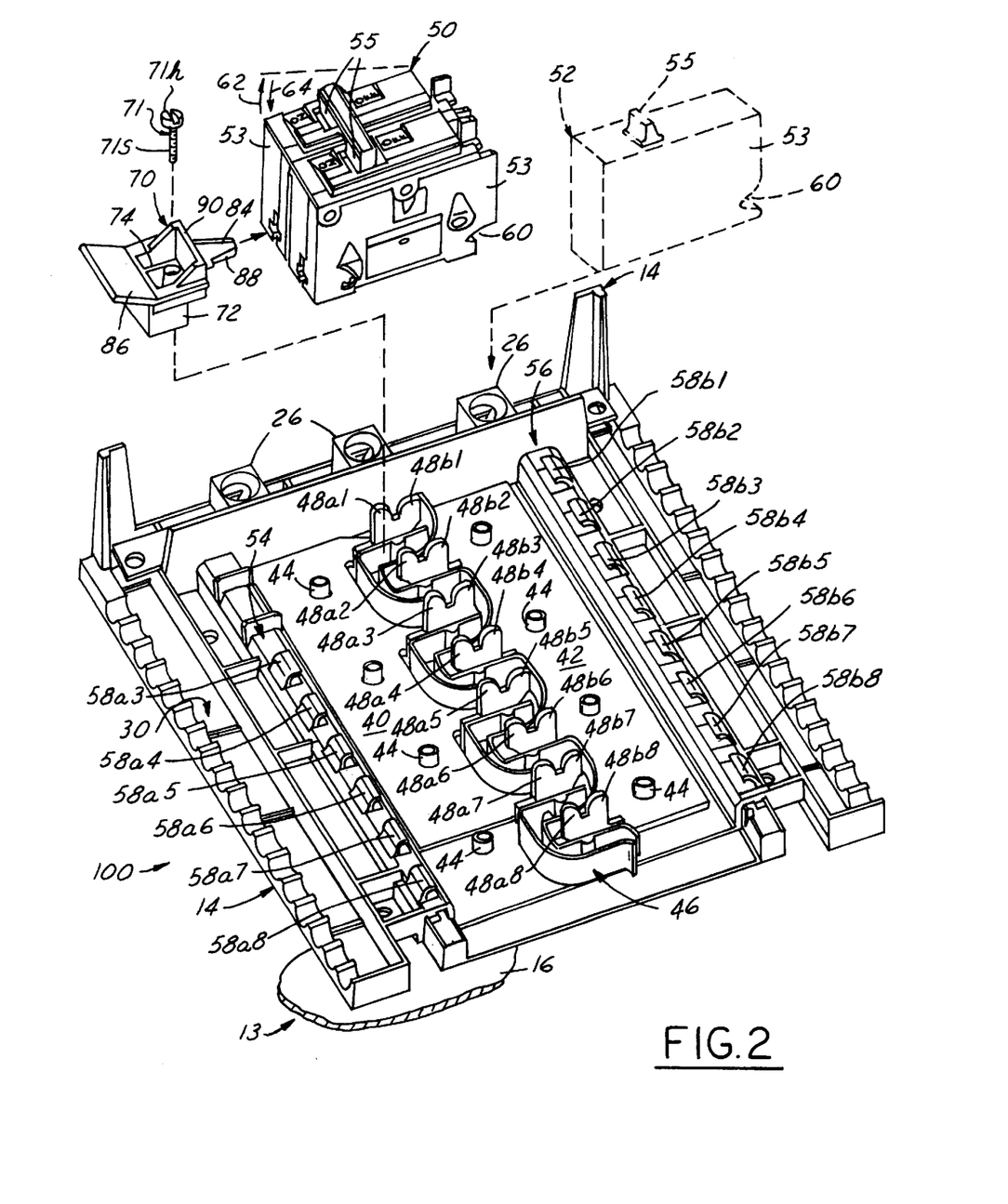
FIG. 2 is a view similar to FIG. 1, but showing certain parts detached from the panel to reveal certain features not seen in FIG. 1.
Figure 3:
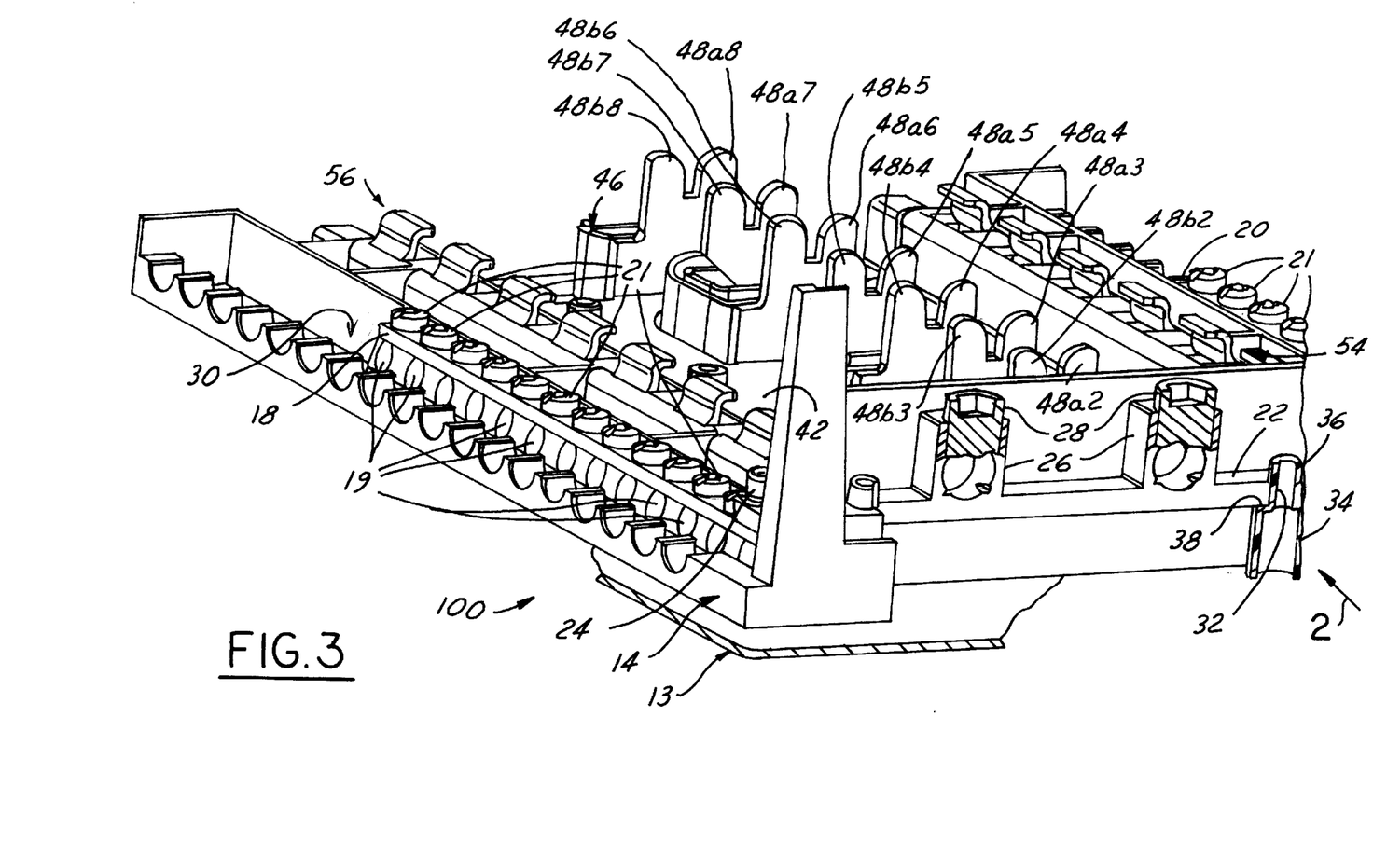
FIG. 3 is a perspective view from a different direction for showing certain additional parts not shown in FIG. 1, but nevertheless present in the panel.
Figure 4:
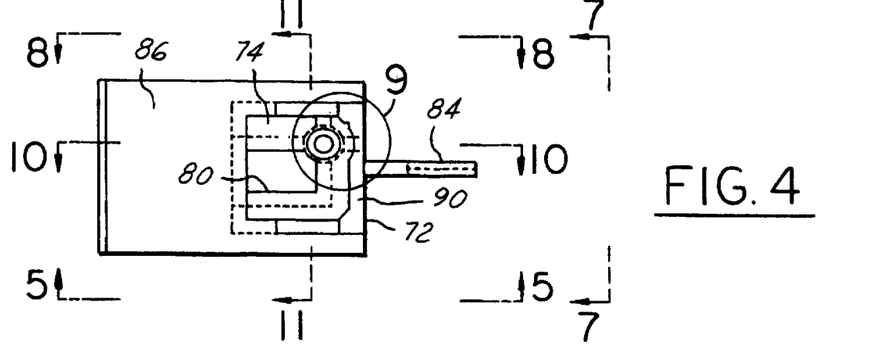
FIG. 4 is a front longitudinal view, on a larger scale, of one of the detached parts of FIG. 2, namely a hold-down.
Figure 5:
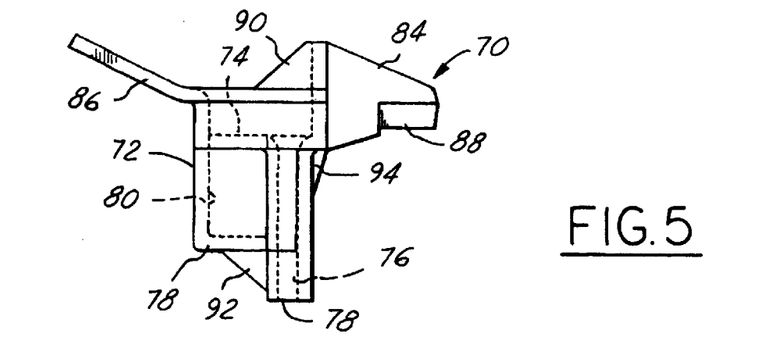
FIG. 5 is a view in the direction of arrows 5—5 in FIG. 4.
Figure 6:
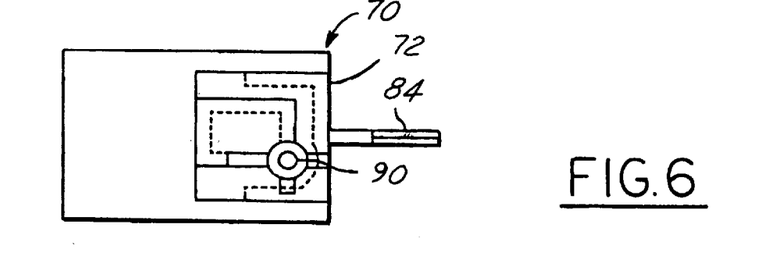
FIG. 6 is a rear longitudinal view of FIG. 4.
Figure 7:
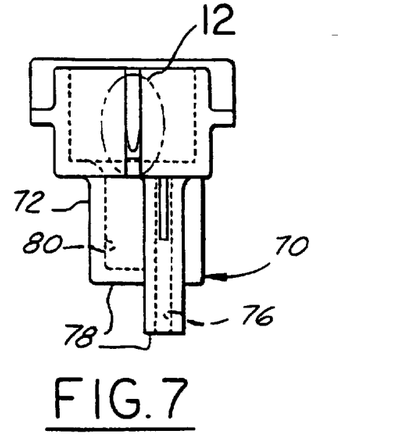
FIG. 7 is a view taken in the direction of arrows 7—7 in FIG. 4.
Figure 8:
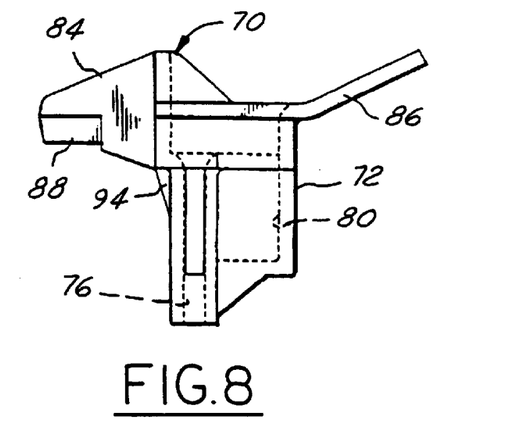
FIG. 8 is a view taken in the direction of arrows 8—8 in FIG. 4.
Figure 9:
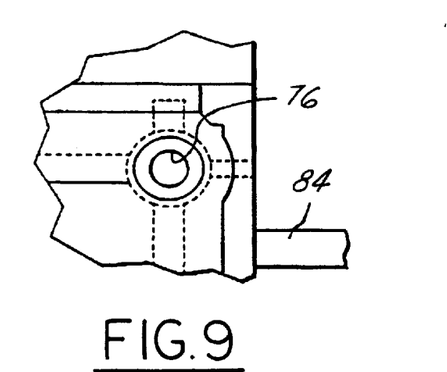
FIG. 9 is an enlarged view in oval 9 in FIG. 4.
Figure 10:
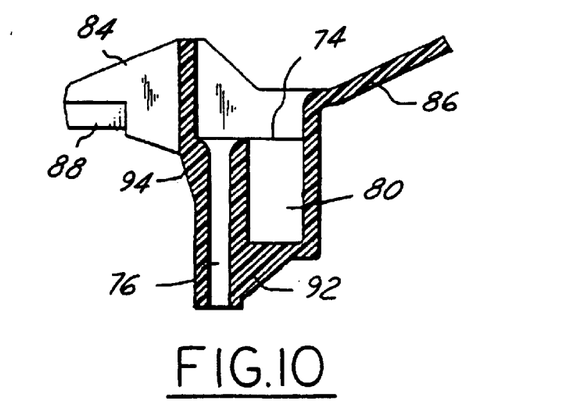
FIG. 10 is a cross section view taken in the direction of arrows 10—10 in FIG. 4.
Figure 11:
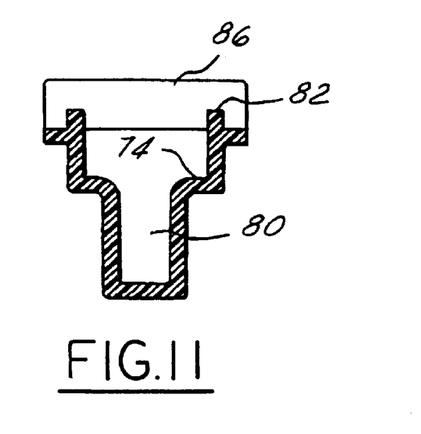
FIG. 11 is a cross section view taken in the direction of arrows 11—11 in FIG. 4.
Figure 12:
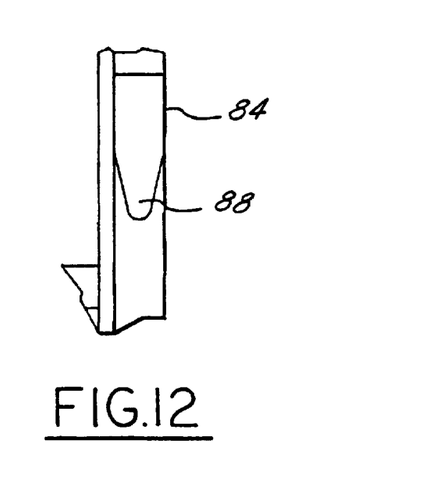
FIG. 12 is an enlarged view in oval 12 in FIG. 7.

FIGS. 1, 2 and 3 show a portion of an exemplary electrical panel 100 comprising a metal enclosure 13 and an electrically non-conductive basepan 14. The particular panel shown is of a type sometimes referred to as a load center. Overall, enclosure 13 is of generally rectangular shape, having a front wall, a back wall 16 and four side walls, a portion of back wall 16 being the only portion of enclosure 13 appearing in FIGS. 1, 2, and 3.

Basepan 14 is of generally rectangular shape for fitting within the interior of enclosure 13. The front wall of enclosure 13 comprises a door that is latched closed but can be unlatched for swinging open to expose the deadfront and circuit breaker handles that protrude through openings in the deadfront. Electrical apparatus is mounted on basepan 14 behind the deadfront.

FIG. 3 shows that the electrical apparatus includes a pair of neutral bars 18, 20, each of which is disposed along a respective side of basepan 14 opposite, and parallel to, the other. These neutral bars comprise a series of apertures 19 and fasteners 21 that provide for the connection of individual neutral return wires (not shown) of individual distribution circuits to the neutral that is provided by the electric power utility. The neutral from the electric power utility may be brought into the panel by one or more incoming neutral cables (not shown) fastened to a neutral tie bar 22 inside enclosure 13. Neutral tie bar 22 is disposed against a side of basepan 14 perpendicular to the sides against which neutral bars 18, 20 are disposed, and each of its opposite ends is mechanically fastened in electrically conductive relationship to a respective end of a respective neutral bar, such as by a screw 24. Neutral tie bar 22 comprises at least one upstanding lug 26 into which an end of a neutral cable can be inserted and held clamped in place by a set screw 28.

The neutral bars are disposed in respective slots 30 of basepan 14, and the neutral tie bar comprises through-holes 32 by which it is mounted on basepan 14 so as to be electrically isolated from enclosure 13. Basepan 14 is itself secured on enclosure 13 by a suitable attachment structure, and although the back of basepan 14 is disposed against back wall 16 of enclosure 13, actual contact between them is localized at various locations.

Basepan 14 comprises stepped mounting posts 34 whose ends 36 pass through and beyond through-holes 32 in neutral tie bar 22 while the margin surrounding each through-hole 32 is spaced slightly from a circular stepped ledge 38 of the respective post 34. Where ends 36 protrude through the neutral tie bar through-holes, they are subsequently deformed, such as by heat staking, to assist in holding the neutral tie bar.

Two bus bars 40, 42 (see FIGS. 2 and 3) are disposed side-by-side on basepan 14, but in non-contacting relationship due to a serpentine wall 46 that is present on basepan 14 between the two bus bars. Each bus bar comprises a hole pattern that matches a corresponding pattern of bosses 44 of basepan 14. After the bus bars have been placed on the basepan to pass bosses 44 through the bus bars'holes, the free ends of the bosses that protrude beyond the bus bar holes are deformed against the holes'margins by a procedure, such as heat-staking for example, to secure or otherwise associate the bus bars to or with the basepan.

Each bus bar contains a number of stabs, identified by the base numeral 48 in FIGS. 2 and 3, which collectively are arranged in two parallel rows, with each stab of one row being side-by-side with a stab of the other row, and with each pair of side-by-side stabs being part of the same bus bar. Along the length of each row of stabs, consecutive side-by-side pairs of stabs are parts of alternate ones of bus bars 40, 42. Accordingly the sixteen individual stabs 48 shown in the example of FIG. 2 form two rows of eight stabs wherein stabs in each row are distinguished from those in the other by use of respective suffixes "a" and "b" following the base numeral 48 for each row. Each successive stab in a respective row is further identified by its location in the row, i.e. 48a1, 48a2 . . . 48a8, and 48b1, 48b2 . . . 48b8. Hence the stabs 48 identified by an odd number suffix are parts of bus bar 40, while those identified by an even number suffix are parts of bus bar 42. Each stab 48 points in a frontal direction within the panel away from basepan 14 and toward the deadfront. Wall 46 has a shape that winds between the stabs in the manner shown; however, the free end of each stab extends frontally farther toward the deadfront than does wall 46.

Panel 100 comprises a main circuit breaker 50 (shown in both FIGS. 1 and 2) and a number of distribution circuit breakers 52, only one of which is portrayed in phantom in FIG. 1. The profile of main circuit breaker 50 is representative of the profiles of distribution circuit breakers 52. The pictured embodiment of main circuit breaker 50 comprises two conjoined casings 53. Each is representative of the shape of a casing of a distribution circuit breaker 52. Each circuit breaker casing comprises its own operating mechanism including an operating handle 55 that protrudes from the casing and through the deadfront when the latter is in place in the enclosure. The two operating handles 55 of main circuit breaker 50 are ganged together for operation in unison. In the example illustrated, each row of circuit breakers is intended to comprise six distribution circuit breakers 52, with each of those in one row being side-by-side with a respective one in the other row. Main circuit breaker 50 is disposed in one of the rows, but the space in the other row that is side-by-side with it, is left vacant of any circuit breakers.

Basepan 14 further comprises two parallel circuit breaker retainer rows 54, 56, each of which runs alongside an outboard edge of a respective bus bar 40, 42. Formed in each circuit breaker retainer row are a succession of hook-shaped retention tabs, identified by the base numeral 58, each of which is in a location directly across a bus bar from the nearest stab 48. Literal and numeric suffixes have been added to the base number of each tab 58 to identify an association with a respective similarly suffixed stab 48.

Each tab 58 has a free end that points toward the associated stab 48. A corner of each circuit breaker casing comprises a slot, such as the slot 60 seen in the nearer casing 53 of main circuit breaker 50 in FIG. 2, shaped to allow the circuit breaker to be installed in panel 100 by first canting the circuit breaker at an angle (represented by the numeral 62 in FIG. 2) and then sliding the slot over the free end of the tab. Thereupon, the circuit breaker is swung from its canted position in the direction of arc 64 in FIG. 2.

The back face of each circuit breaker casing contains a plug-on terminal that, once its slot 60 has been fitted over the free end of the corresponding retention tab 58, becomes mated with the associated stab 48 as the circuit breaker is swung to final position along arc 64.

When main circuit breaker 50 has been installed in panel 100, slots 60 of its two conjoined casings 53 fit onto the free ends of tabs 58b1 and 58b2 respectively, and its two plug-on terminals are mated with stabs 48b1 and 48b2 respectively. The circuit breaker casings rest on wall 46 and retainer row 56.

The distribution circuit breakers 52 are installed in panel 100 in like manner in each of the two rows. The six distribution circuit breakers that are in the same row as main circuit breaker 50 have respective slots 60 that are engaged with tabs 58b3 through 58b8 respectively, and those in the other row, respective slots 60 engaged with tabs 58a3 through 58a8 respectively. Each of the distribution circuit breakers has a terminal that is mated with a respective stab 48. Hence, these terminals of the six distribution circuit breakers 52 that are in the same row as main circuit breaker 50 are mated with stabs 48b3 through 48b8 respectively, and those in the other row, with stabs 48a3 through 48a8 respectively.

An incoming hot feed (not shown) is brought into panel 100 from the electric power utility by one or more incoming hot cables, and electric connection is established to respective load terminals (not shown) of main circuit breaker 50 that are on the respective casings 53 of the main circuit breaker. The two plug-on terminals of main circuit breaker 50 are mated respectively with stabs 48b1 and 48b2. These two plug-on terminals serve as load terminals of main circuit breaker 50 to which the plug-on terminals of distribution circuit breakers 52 are connected by a corresponding bus bar and the respective stabs 48 that engage them. Each distribution circuit breaker 52 also has a load terminal to which a respective distribution wire (not shown) of a respective distribution circuit is connected at time of panel installation.

When the ganged handles 55 of main circuit breaker 50 are operated to off position, bus bars 40, 42 are not hot, and so no power is available to the distribution circuit breakers. When the ganged handles of main circuit breaker 50 are operated to the on position, the bus bars are hot, and so power is available to the distribution circuit breakers 52. Because each distribution circuit breaker can be operated to its respective on and off positions, a distribution circuit connected to a distribution circuit breaker is hot when the distribution circuit breaker and the main circuit breaker have both been placed in on positions by their operating handles. When an individual distribution circuit breaker is operated off, or tripped by a fault in its distribution circuit, power ceases to be delivered to the distribution circuit. When the main circuit breaker is operated off, or tripped by a fault, power ceases to be delivered to any of the distribution circuit breakers and their distribution circuits.

After main circuit breaker 50 has been placed in position with its casings' slots 60 fitting over the free ends of tabs 58b1 and 58b2, and with its plug-on terminals mated with stabs 48b1 and 48b2, it is attached to basepan 14 by an attachment that comprises a first part 70 and a second part 71. Part 70 is believed to be a uniquely constructed hold-down, and part 71 is a screw. Hold-down 70 is a non-electrically conductive part, such as a suitably molded plastic, that engages a side of main circuit breaker 50 opposite the side that contains slots 60, and screw 71 attaches the hold-down to the basepan. Details of hold-down 70 are shown in FIGS. 4–12.

Hold-down 70 comprises a body 72 having a frontal surface 74 that faces the deadfront when the hold-down is in attached position attaching the main circuit breaker to the basepan. Surface 74 has a generally rectangular shape. A circular through-hole 76 that has a tapered counterbore at its entrance end is located toward a corner of surface 74 and extends from surface 74 through body 72 to a back surface 78 of body 72. Body 72 further comprises a well 80 that extends into the body from frontal surface 74. Well 80 is closed, except for being open at surface 74. Back surface 78 is staggered such that through-hole 76 extends farther from surface 74 than does well 80.

A wall 82 is disposed around the perimeter of surface 74 to bound circumferentially the openings of through-hole 76 and well 80 at surface 74. When the hold-down is in attached position attaching the main circuit breaker to the basepan, wall 82 extends away from surface 74 toward the deadfront.

A circuit-breaker-engaging projection 84 projects laterally from one side of body 72, and a tab 86, from the opposite side. Projection 84 may be generally described as a wall that occupies a plane that is parallel with, but offset from the axis of through-hole 76. As viewed in FIGS. 5 and 10, projection 84 is shown generally to have a narrowing taper as it projects away from body 72. The free end of an edge of projection 84 that faces toward the back of the hold-down is shown to comprise a tapered wedge segment 88.

When the hold-down is in attached position attaching main circuit breaker 50 to the basepan as shown in FIG. 1, projection 84 fits into a space between casings 53 of the main circuit breaker with wedge segment 88 wedging against a portion of the joined casings. At the location of well 80, back surface 78 bears against wall 46, and through-hole 76 is in alignment with a hole in basepan 14.

Figure 13:
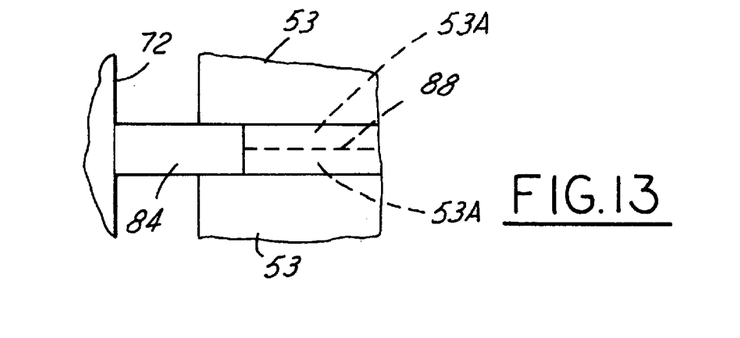
FIG. 13 is an enlarged fragmentary view in the direction of arrows 13—13 in FIG. 1.

FIG. 13 shows projection 84 projecting from body 72 of the hold-own to fit within a space between the two casings 53 of the side-by-side conjoined circuit breakers constiuting circuit breaker 50 and wedge segment 88 engaging a portion 53A of the conjoined circuit breakers in a manner that prevents the main circit breaker from being detached from the panel while the hold-down is in attached position.

Screw 71 comprises a head 71h and a threaded shank 71s. Hold-down 70 is held attached to the basepan by passing screw shank 71s through through-hole 76 and screwing it into the aligned hole in the basepan. The screw is tightened until its head 71h forcefully bears against the margin of the through-hole at surface 74. A suitable screw engagement tool is used to fasten the hold-down in place, which may be done at a factory where the panel is manufactured.

With the hold-down having been installed to hold main circuit breaker 50 in place on basepan 14, tab 86 extends frontally away from body 72 at an angle to surface 74, skewed to the length of through-hole 76. Tab 86 functions to provide an obstruction that prevents installation of additional circuit breakers in the vacant space overlying bus bar 40 alongside main circuit breaker 50. Additionally, the attachment provided by hold-down 70 and screw 71 is designed to at least better prevent removal of the main circuit breaker from the panel unless screw 71 is first sufficiently loosened, and perhaps even removed from the hold-down, to allow movement of the hold-down to a position that disengages projection 84 from the main circuit breaker casings. Because unfastening of screw 71 may involve the use of a hand tool, such as a screwdriver, features of the hold-down are intended to minimize or at least reduce the risk that the tool might contact parts other than the attachment screw and the hold-down during the process of unfastening the attachment screw. Tab 88 is also intended to be grippable between a person's thumb and forefinger to facilitate installation and removal. Tab 88 may be provided with further useful features, such as texturing or ribbing to facilitate gripping, and informational and/or warning indicia. Hold-down 70 may also be distinctively colored as a potential aid in directing a person's attention to it so that the presence of a main circuit breaker in a panel may be better recognized.

Conventional manufacturing features for molded plastic parts are incorporated in hold-down 70. Examples are reinforcements, such as indicated by the numerals 90, 92, and 94.

Should the reader desire additional information about more specific aspects of panel 100 that are not believed to concern the present invention, the referenced, commonly-owned, pending U.S. patent application may be consulted.

While the present invention has been described with reference to a preferred embodiment as currently contemplated, it should be understood that the invention is not intended to be limited to that embodiment. Accordingly, the invention is intended to encompass various modifications and arrangements that are within the scope of the claims.

What is claimed is:

1. An electric distribution panel through which incoming electric power is distributed through circuit breakers to individual distribution circuits, the panel comprising:

a main circuit breake through which incoming electric power passes;

a number of individual distribution circuit breakers;

first and second bus bars for delivering incoming electric power from the main circuit breaker to the individual distribution circuit breakers;

an attachment for attaching the main circuit breaker to the panel that requires performance of a manual operation before the main circuit breaker can be detached from the panel;

the attachment comprising a firm pant and a second part;

the first part, when in attached position preventing the main circuit breaker from being detached from the panel;

the second part, when in attaching position, keeping the first part in attached position;

the second part being operable by a manual operation from attaching position to a non-attaching position to allow the first part to move to a non-attached position that ceases to prevent the main circuit breaker from being detached from the panel, the main circuit breaker comprising two side-by-side conjoined circuit breakers;

and the first part comprising a body with which the second part interacts and a projection projecting from the body to fit within a space between the side-by-side conjoined circuit breakers and engage a portion of the conjoined circuit breakers in a manner That prevents them from being detached from the panel while the first part is in attached position.

2. An electric distribution panel as set forth in claim 1 wherein the body comprises a through-hole and the second part comprises a fastener that acts via the through-hole to hold the first part in the panel.

3. An electric distribution panel as set forth in claim 2 wherein fastener comprises a screw having a head that bears against the body and a threaded shank that extends from the head through the through-hole.

4. An electric distribution panel as set forth in claim 3 wherein the body comprises a frontally facing surface against which the screw head bears and a wall extending frontally from the frontally facing surface and circumferentially bounding at least a portion of the screw head.

5. An electric distribution panel as set forth in claim 4 wherein the body comprises a walled well having a frontal opening disposed adjacent the through-hole.

6. An electric distribution panel as set forth in claim 5 wherein the wall extending frontally from the frontally facing surface and circumferentially bounding at least a portion of the screw head fully circumferentially bounds both the screw head and the frontal opening of the well.

7. An electric distribution panel as set forth in claim 6 wherein the projection projects laterally from a first side of the body, and the body includes a further projection projecting from a second side of the body opposite the first side.

8. An electric distribution panel as set forth in claim 7 wherein the further projection comprises a tab occupying a plane that is skewed to the length of the through-hole.

9. An electric distribution panel as set forth in claim 7 wherein the further projection comprises a tab that has a size sufficient for gripping between a person's thumb and forefinger.

10. An electric distribution panel as set forth in claim 1 wherein the projection is disposed at a first side of the body and the first part further comprises a tab projecting from a second side of the body.

11. An electric distribution panel as set forth in claim 10 wherein the first and second sides of the body are disposed opposite each other and the tab extends at an angle frontally of the body.

12. An electric distribution panel as set forth in claim 11 wherein the body comprises a through-hole and the second part comprises a fastener that acts via the through-hole to hold the first part in the panel.

* * * * *

UNITED STATES PATENT AND TRADEMARK OFFICE
CERTIFICATE OF CORRECTION

PATENT NO. : 5,973,914
DATED : October 26, 1999
INVENTOR(S) : Rose, et. al.

It is certified that error appears in the above-identified patent and that said Letters Patent is hereby corrected as shown below:

<u>CLAIM 1</u>

Line 21: following "comprising a" replace "firm pant" with --first part--

Line 39: following "manner" capital "T" in "That" should be lowercase --that--

Signed and Sealed this

Twenty-fifth Day of July, 2000

Attest:

*Attesting Officer*

Q. TODD DICKINSON

*Director of Patents and Trademarks*